(12) United States Patent
Procopio

(10) Patent No.: US 8,458,196 B1
(45) Date of Patent: Jun. 4, 2013

(54) SYSTEM AND METHOD FOR DETERMINING TOPIC AUTHORITY

(75) Inventor: Michael Jeffrey Procopio, Boulder, CO (US)

(73) Assignee: Google Inc., Mountain View, CA (US)

( * ) Notice: Subject to any disclaimer, the term of this patent is extended or adjusted under 35 U.S.C. 154(b) by 0 days.

(21) Appl. No.: 13/363,210

(22) Filed: Jan. 31, 2012

(51) Int. Cl.
*G06F 17/30* (2006.01)

(52) U.S. Cl.
USPC ........................................... 707/749

(58) Field of Classification Search
USPC ................... 707/706, 723, 748, 749
See application file for complete search history.

(56) References Cited

U.S. PATENT DOCUMENTS

| | | | |
|---|---|---|---|
| 5,963,940 A | 10/1999 | Liddy et al. | |
| 6,236,987 B1 | 5/2001 | Horowitz et al. | |
| 6,349,307 B1 | 2/2002 | Chen | |
| 7,065,532 B2 | 6/2006 | Elder et al. | |
| 7,080,082 B2 | 7/2006 | Elder et al. | |
| 7,103,609 B2 | 9/2006 | Elder et al. | |
| 7,130,844 B2 | 10/2006 | Elder et al. | |
| 7,249,123 B2 | 7/2007 | Elder et al. | |
| 7,257,569 B2 | 8/2007 | Elder et al. | |
| 7,765,212 B2 | 7/2010 | Surendran et al. | |
| 7,853,594 B2 | 12/2010 | Elder et al. | |
| 7,860,811 B2 | 12/2010 | Flinn et al. | |
| 8,255,421 B2 * | 8/2012 | Maeda et al. | 707/791 |
| 2004/0088315 A1 | 5/2004 | Elder et al. | |
| 2004/0088322 A1 | 5/2004 | Elder et al. | |
| 2004/0088649 A1 | 5/2004 | Elder et al. | |
| 2004/0254911 A1 | 12/2004 | Grasso et al. | |
| 2005/0198044 A1 * | 9/2005 | Kato et al. | 707/100 |
| 2006/0195461 A1 | 8/2006 | Lo et al. | |
| 2007/0078889 A1 | 4/2007 | Hoskinson | |
| 2007/0150470 A1 | 6/2007 | Brave et al. | |
| 2009/0287682 A1 | 11/2009 | Fujioka et al. | |
| 2009/0319907 A1 | 12/2009 | Tokuda | |
| 2010/0003658 A1 * | 1/2010 | Fadel et al. | 434/322 |
| 2010/0023311 A1 * | 1/2010 | Subrahmanian et al. | 704/2 |
| 2010/0094879 A1 * | 4/2010 | Donnelly et al. | 707/749 |
| 2010/0205541 A1 * | 8/2010 | Rapaport et al. | 715/753 |
| 2011/0016121 A1 * | 1/2011 | Sambrani et al. | 707/734 |
| 2011/0029534 A1 * | 2/2011 | Maeda et al. | 707/738 |
| 2011/0113040 A1 | 5/2011 | Bickel et al. | |
| 2011/0145719 A1 | 6/2011 | Chen et al. | |
| 2011/0258229 A1 | 10/2011 | Ni et al. | |

(Continued)

OTHER PUBLICATIONS

U.S. Appl. No. 13/363,024, filed Jan. 31, 2012, Procopio, et al.

(Continued)

*Primary Examiner* — Cam-Linh Nguyen
(74) *Attorney, Agent, or Firm* — Young, Basile, Hanlon & MacFarlane P.C.

(57) ABSTRACT

A method and system for determining topical authority may include receiving topic information for a document, the information including at least one topic and a weight for each topic, where the topic relates to content of the document, and the weight represents how strongly the topic is associated with the document. Authorship information for the document may be received, the information including, for each topic in the document, at least one author and an authorship percentage for each author. An update to an authority signature value for a first author of a first topic may be generated based on a product of an authorship percentage for the first author of the first topic and the weight of the first topic in the document, where the first topic is included in the received topic information.

17 Claims, 5 Drawing Sheets

U.S. PATENT DOCUMENTS

2012/0136812 A1  5/2012  Brdiczka
2012/0173561 A1  7/2012  Kim et al.
2012/0254191 A1* 10/2012 Sanyal et al. ............... 707/744

OTHER PUBLICATIONS

U.S. Appl. No. 13/363,067, filed Jan. 31, 2012, Procopio, et al.
U.S. Appl. No. 13/363,152, filed Jan. 31, 2012, Procopio.
U.S. Appl. No. 13/363,126, filed Jan. 31, 2012, Procopio.
U.S. Appl. No. 13/363,094, filed Jan. 31, 2012, Procopio, et al.
U.S. Appl. No. 13/363,169, filed Jan. 31, 2012, Procopio.
U.S. Appl. No. 13/363,195, filed Jan. 31, 2012, Procopio.
U.S. Appl. No. 13/363,221, filed Jan. 31, 2012, Procopio.
U.S. Office Action, mailed on Nov. 21, 2012, in the related U.S. Appl. No. 13/363,169.
Notice of Allowance mailed on Feb. 11, 2013, in the related U.S. Appl. No. 13/363,221.
James Allan, "Topic Detection and Tracking-Event-Based Information Organization," 2002, Kluwer Academic Publishers, Norwell, Massachusetts, USA; http://books.google.com/books?hl=en&lr=&id=50hnLI_Jz3cC&oi=fnd&pg=PR9&dq=topic+detection+and+tracking+event-based+information+organization&ots=nfu5nDwUa0&sig=U2ITFv2_AMnciqo9J8WLaS9lv98#v=onepage&q=topic%20detection%20and%20tracking%20event-based%20inform&f=false (last visited on Jan. 31, 2012).
Stefan Siersdorfer and Sergej Sizov, "Automatic Document Organization in a P2P Environment," 2006, Springer, Berlin, Germany; http://www.springerlink.com/content/27140h768278629r/ (last visited on Jan. 31, 2012).
Dr. E. Garcia, "Cosine Similarity and Term Weight Tutorial," http://www.miislita.com/information-retrieval-tutuorial/cosine-similarity-tutorial.html (last visited on Jan. 30, 2012).

* cited by examiner

DOCUMENT 1 - AUTHORSHIP DISTRIBUTION

| TOPIC | AUTHOR (% CONTRIBUTION) |
|---|---|
| A | USER X (80%) |
| A | USER Y (20%) |
| B | USER Z (100%) |

DOCUMENT 2 - AUTHORSHIP DISTRIBUTION

| TOPIC | AUTHOR (% CONTRIBUTION) |
|---|---|
| A | USER X (100%) |
| C | USER Y (100%) |

DOCUMENT 3 - AUTHORSHIP DISTRIBUTION

| TOPIC | AUTHOR (% CONTRIBUTION) |
|---|---|
| C | USER Y (60%) |
| C | USER Z (40%) |

DOCUMENT 4 - AUTHORSHIP DISTRIBUTION

| TOPIC | AUTHOR (% CONTRIBUTION) |
|---|---|
| A | USER X (100%) |
| B | USER X (30%) |
| B | USER Z (70%) |
| D | USER X (50%) |
| D | USER Z (50%) |

FIG. 3

USER X - AUTHORITY SIGNATURE — 402

USER EXPERTISE — 440

| TOPIC | DOC. 1 | DOC. 2 | DOC. 3 | DOC. 4 | TOTAL |
|---|---|---|---|---|---|
| A | (0.80 * 0.70) | (1.0 * 0.05) | -- | (1.0 * 0.50) | 1.11 |
| B | -- | -- | -- | (0.30 * 0.35) | 0.11 |
| D | -- | -- | -- | (0.50 * 0.15) | 0.08 |

USER Y - AUTHORITY SIGNATURE — 404

USER EXPERTISE

| TOPIC | DOC. 1 | DOC. 2 | DOC. 3 | DOC. 4 | TOTAL |
|---|---|---|---|---|---|
| A | (0.20 * 0.70) | -- | -- | -- | 0.14 |
| C | -- | (1.0 * 0.95) | (0.60 * 1.0) | -- | 1.55 |

USER Z - AUTHORITY SIGNATURE — 406

USER EXPERTISE

| TOPIC | DOC. 1 | DOC. 2 | DOC. 3 | DOC. 4 | TOTAL |
|---|---|---|---|---|---|
| B | (1.0 * 0.30) | -- | -- | (0.70 * 0.35) | 0.55 |
| C | -- | -- | (0.4 * 1.0) | -- | 0.40 |
| D | -- | -- | -- | (0.50 * 0.15) | 0.08 |

FIG. 4

SYSTEM AND METHOD FOR DETERMINING TOPIC AUTHORITY

CROSS REFERENCES TO RELATED APPLICATIONS

The following U.S. patent applications are filed concurrently herewith and are assigned to the same assignee hereof and contain subject matter related, in certain respect, to the subject matter of the present application. These patent applications are incorporated herein by reference.

Ser. No. 13/363,067 is now pending, filed Jan. 31, 2012 for "SYSTEM AND METHOD FOR INDEXING DOCUMENTS";

Ser. No. 13/363,024 is now pending, filed Jan. 31, 2012 for "SYSTEM AND METHOD FOR COMPUTATION OF DOCUMENT SIMILARITY";

Ser. No. 13/363,152 is now pending, filed Jan. 31, 2012 for "SYSTEM AND METHOD FOR CONTENT-BASED DOCUMENT ORGANIZATION AND FILING";

Ser. No. 13/363,126 is now pending, filed Jan. 31, 2012 for "SYSTEM AND METHOD FOR DETERMINING ACTIVE TOPICS";

Ser. No. 13/363,094 is now pending, filed Jan. 31, 2012 for "SYSTEM AND METHOD FOR AUTOMATICALLY DETERMINING DOCUMENT CONTENT";

Ser. No. 13/363,169 is now pending, filed Jan. 31, 2012 for "SYSTEM AND METHOD FOR DETERMINING TOPIC INTEREST";

Ser. No. 13/363,195 is now pending, filed Jan. 31, 2012 for "SYSTEM AND METHOD FOR DETERMINING SIMILAR USERS"; and Ser. No. 13/363,221 is now pending, filed Jan. 31, 2012 for "SYSTEM AND METHOD FOR DETERMINING SIMILAR TOPICS."

BACKGROUND

Databases may include large quantities of documents including content covering a wide variety of topics. Each document may be authored by one or more users. Each of the many users may have expertise and/or authority in one or more topics, and it may be desirable to determine users with expertise in a certain topics.

SUMMARY

Briefly, aspects of the present disclosure are directed to methods and systems for receiving topic information for a document, the information including at least one topic and a weight for each topic, where the topic relates to content of the document, and the weight represents how strongly the topic is associated with the document. Authorship information for the document may be received, the information including, for each topic in the document, at least one author and a topic authorship percentage for each author. An update to an authority signature value for a first author of a first topic may be generated based on a product of an authorship percentage for the first author of the first topic and the weight of the first topic in the document, where the first topic is included in the received topic information.

This SUMMARY is provided to briefly identify some aspects of the present disclosure that are further described below in the DESCRIPTION. This SUMMARY is not intended to identify key or essential features of the present disclosure nor is it intended to limit the scope of any claims.

The term "aspects" is to be read as "at least one aspect". The aspects described above and other aspects of the present disclosure described herein are illustrated by way of example(s) and not limited in the accompanying figures.

BRIEF DESCRIPTION OF THE DRAWING

A more complete understanding of the present disclosure may be realized by reference to the accompanying figures in which:

FIG. 3 is a diagram of document authorship information one or more documents according to aspects of the present disclosure;

FIG. 4 is a diagram of user authority signatures according to aspects of the present disclosure.

Figure 1:
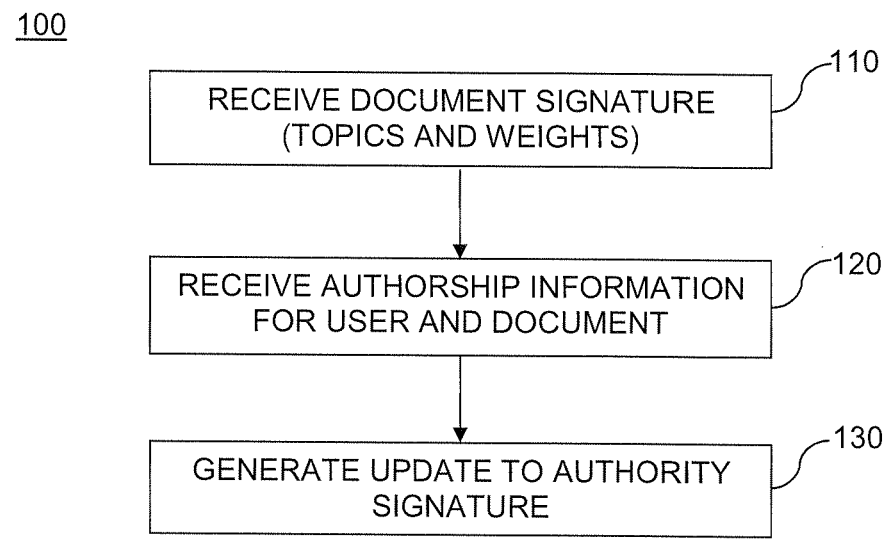
FIG. 1 is a flowchart of a method according to aspects of the present disclosure.

The illustrative aspects are described more fully by the Figures and detailed description. The present disclosure may, however, be embodied in various forms and is not limited to specific aspects described in the Figures and detailed description.

DESCRIPTION

The following merely illustrates the principles of the disclosure. It will thus be appreciated that those skilled in the art will be able to devise various arrangements which, although not explicitly described or shown herein, embody the principles of the disclosure and are included within its spirit and scope.

Furthermore, all examples and conditional language recited herein are principally intended expressly to be only for pedagogical purposes to aid the reader in understanding the principles of the disclosure and the concepts contributed by the inventor(s) to furthering the art, and are to be construed as being without limitation to such specifically recited examples and conditions.

Moreover, all statements herein reciting principles and aspects of the disclosure, as well as specific examples thereof, are intended to encompass both structural and functional equivalents thereof. Additionally, it is intended that such equivalents include both currently known equivalents as well as equivalents developed in the future, e.g., any elements developed that perform the same function, regardless of structure.

Thus, for example, it will be appreciated by those skilled in the art that any block diagrams herein represent conceptual views of illustrative circuitry embodying the principles of the disclosure. Similarly, it will be appreciated that any flow charts, flow diagrams, state transition diagrams, pseudocode, and the like represent various processes which may be substantially represented in computer readable medium and so executed by a computer or processor, whether or not such computer or processor is explicitly shown.

The functions of the various elements shown in the Figures, including any functional blocks labeled as "processors", may be provided through the use of dedicated hardware as well as hardware capable of executing software in association with appropriate software. When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, digital signal processor (DSP) hardware, network processor, application specific integrated circuit (ASIC), field programmable gate array (FPGA), read-only memory (ROM) for storing software, random access memory (RAM), and non-volatile storage. Other hardware, conventional and/or custom, may also be included.

Software modules, or simply modules which are implied to be software, may be represented herein as any combination of flowchart elements or other elements indicating performance of process steps and/or textual description. Such modules may be executed by hardware that is expressly or implicitly shown.

Unless otherwise explicitly specified herein, the drawings are not drawn to scale.

Figure 5:
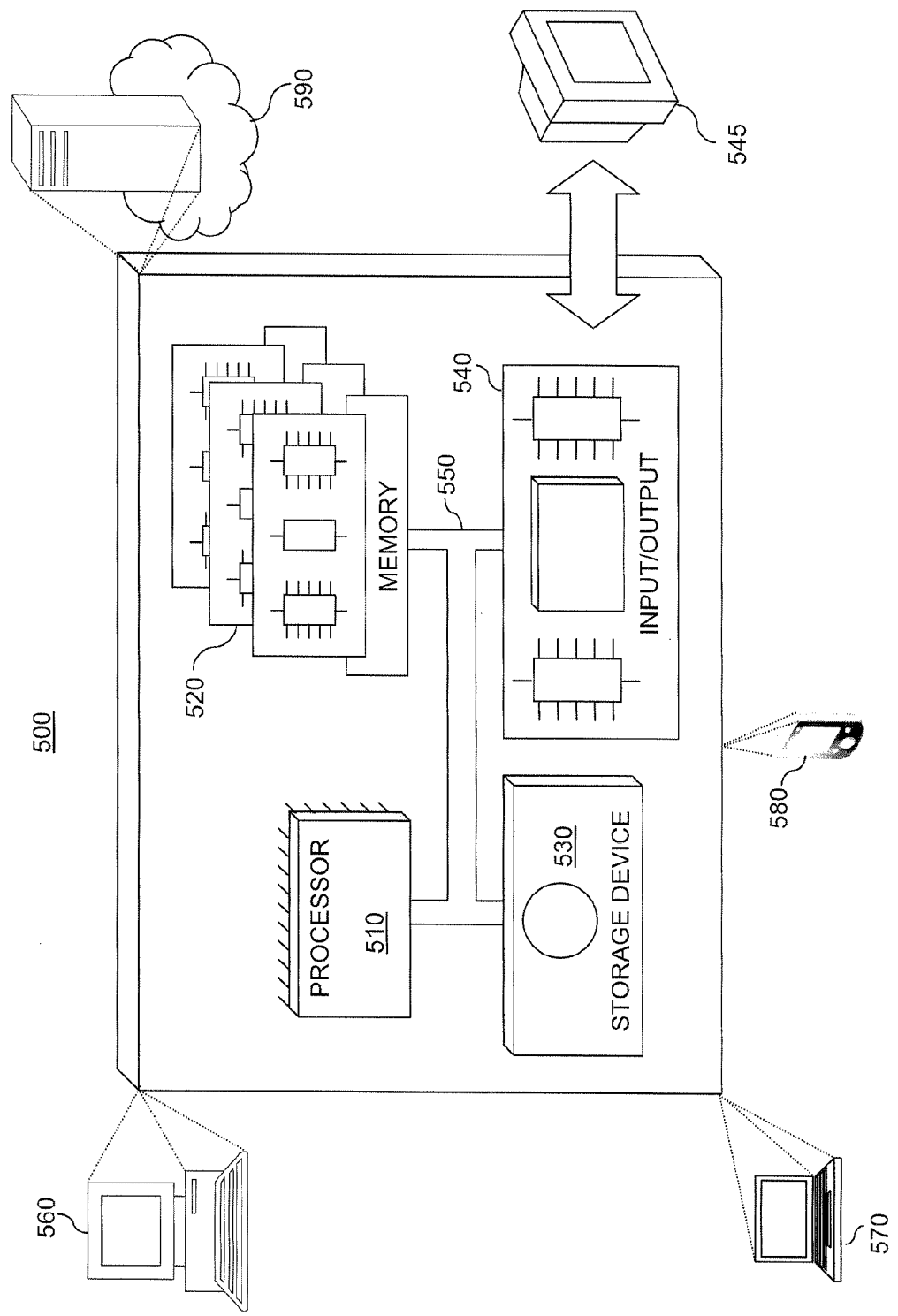
FIG. 5 is a schematic diagram depicting a representative computer system for implementing and exemplary methods and systems for indexing and searching documents according to aspects of the present disclosure.

In FIG. 1, there is shown a flow diagram 100, which defines steps of a method according to aspects of the present disclosure. Methods and systems of the present disclosure may be implemented using, for example, a computer system 500 as depicted in FIG. 5 or any other system and/or device.

In operation 110, a document signature may be received by, for example, system 500. A document signature (e.g., topic information, signature information) may include, for example, at least one topic and a weight for each topic. Topic(s) may, for example, relate to content and/or text of a document, and a weight for a topic may, for example, represent how strongly the topic is associated with the document.

Documents discussed herein may include document text or content. Document text may be, for example, a text-based representation of a document. The document may include text (e.g., a word processing document, text file, portable document format (pdf), spreadsheet, or presentation), or may have text associated therewith, such as in a transcript, when the document is a video (e.g., a web-based video or any other type of video), an audio file (e.g., an audio recording, podcast, or any type of audio), or another type of electronically stored file. Document text may be present in a document text file separate from the document. In that case, the document text file may be linked to and/or stored with the document and/or may be stored separately. It will be understood that operations involving the text of a document may be performed on or with the document or the document text file depending on the location of text.

Topics may be, for example, categories, abstract ideas, subjects, things, and/or concepts representing the content or subject matter of a document. Topics may be, for example, an abstract notion of what a document text pertains to, is related to, and/or is about. A topic may, in some aspects, be a concept that at least a portion of the document is about. A topic may or may not be a term present in a document text but may be, for example, associated with one or more terms present in a document and may be generated by natural language processing or other processes based on one or more terms in a document and/or other information. For example, a document may include text about cars, planes, and boats, all of which appear as terms verbatim in the document. More abstractly, however, it may be determined that the document is about "vehicles" and "modes of transportation." Topics associated with the document may, therefore, be "vehicles," "modes of transportation," and/or other topics.

A weight (e.g., a topic weight or confidence score) may represent how strongly a topic is associated with a document (e.g., document text). A weight may be, for example, a percentage (e.g., between 0% and 100%), a numeric value (e.g., between 0 and 1.0 or any other range), a vector, a scalar, or another parameter, which quantifies or represents how strongly a topic is associated with a document. For example, a document may include text or information relating to one or more topics, and a weight associated with each topic may represent or quantify how much a document text pertains to, is about, or is related to each topic. A sum of weights for all topics associated with a document may, for example, be equal to 1.0, 100%, or another value.

Topic weights may, in some aspects, represent a confidence of association of a topic to a document (e.g., by a natural language processor or other method or system). A topic weight (e.g., corresponding to a topic) may represent a confidence, certainty, and/or likelihood that a document is in whole or in part about that topic. For example, a first topic weight (e.g., 0.70 or 70%) may indicate a confidence of 70% that a document is in whole or in part about the first topic, and a second topic weight (e.g., 0.30 or 30%) may indicate a confidence of 30% that the document is in whole or in part about the second document.

In operation 120, authorship information for a user and a document may be received by, for example, system 500. Authorship information for a document may include for each topic in the document at least one author and an authorship percentage (e.g., topic authorship percentage, first document authorship percentage) for each author. Authorship information may, for example, include for each of one or more topic(s) in a document an authorship, contribution, and/or creation percentages for each author. An authorship, contribution, and/or creation percentage for each author may be, for example, an authorship distribution including for each topic in a document a distribution of authorship for that topic across one or more authors. An authorship percentage may, for example, represent a portion, amount, or quantity of a topic authored, generated, and/or created by an author. Authorship information may be determined based on a user's and/or author's interaction with at least a portion of a document related to a topic (e.g., text a user adds, edits a user makes, or other types of user interaction with a document). For example, an authorship percentage for an author may be based on an amount of text, figure(s), data, and/or information an author adds to, removes from, and/or edits in a portion of a document pertaining to a topic. Authorship information may be based on, for example, an amount of typing a user completes with respect to a topic in a document.

A document may, for example, include document text relating to two or any other number of topics. A first topic may, for example, be co-authored by two or any other number of authors. A percentage or portion (e.g., 80 percent (%) or another percentage) of a first topic (e.g., document content relating to a first topic) may, for example, be authored by a first author. Similarly, a percentage or portion (e.g., 20% or another percentage) of a first topic may, for example, be authored by a second author. Authorship percentages for all authors (e.g., a first author, a second author, and/or any other authors) of a topic may, for example, sum to 100%, 1.0, and/or another value. Authorship percentages for other topics in a document (e.g., all topics in a document) may be similarly received by, for example, system 500.

In some aspects, authorship information for a document may be computed, received, calculated and/or recalculated periodically (e.g., every 2 hours, 1 week, or any other time period), in response to a trigger event (e.g., receipt of new document signatures for a new or existing document, addition of information to a document, removal of information from a document, or any other event), or for any other reason.

In some aspects, authorship information may be received for a second document or any number of documents, a plurality of documents, and/or a set of documents. Authorship information for a second document (e.g., in a set of documents) may include for each topic in the second document, at least one author and a topic authorship percentage for each author.

By way of example, a first and second document may, for example, include one or more common, shared, and/or overlapping topics (e.g., a topic A). Authorship information for the first document may include the one or more common topics (e.g., topic A) and possibly other non-common topics and an authorship percentage for each author of each of the topics in the first document. Similarly, authorship information for a second document may include the one or more common topics (e.g., topic A) and possibly other non-common topics and an authorship percentage for each author or each of the topics in the second document.

In some aspects, an authorship percentage may represent a confidence of association of an author to a topic in a document (e.g., by a natural language processor or other method or system). An authorship percentage (e.g., corresponding to a topic) may represent a confidence, certainty, and/or likelihood that the author is in whole or in part an author of that topic (e.g., in a document).

In operation 130, an update to an authority signature value may be generated. An update of an authority signature value (e.g., expertise signature value) for an author (e.g., a first author) of a topic (e.g., a first topic) may be generated based on a product of an authorship percentage for the author of the topic and a weight of the topic in a document (e.g., a first document). An authority signature value may be, for example, a scalar, vector, array, matrix, table, and/or other data structure. An authority signature value may be updated by, for example, adding a value, entry, and/or information to the authority signature value data structure.

In some aspects, an authority signature value for a second author of a first topic may be updated based on a product of an authorship percentage for the second author of the first topic and a weight of the first topic in a document. A topic may be authored by, for example, two or any number of authors, and an update to an authority signature value for a first author of that topic and an update to an authority signature value for a second author of that topic may be generated. As shown in the following table, a topic weight for a first topic in a document, an authorship percentage for a first author of the first topic, an authorship percentage for a second author of the first topic, and possibly other information may be received.

| Topic | Weight | 1$^{st}$ Author | 2$^{nd}$ Author |
| --- | --- | --- | --- |
| 1$^{st}$ Topic | 0.70 | 0.80 | 0.20 |

A first topic weight may be, for example, 0.70 or any other value. Eighty percent (e.g., 80%) of document content related to the first topic may be authored by a first author, and 20% of document content related to the first topic may be authored by a second author. An authority signature value for a first author of the first topic may be updated by adding a product of the authorship percentage for the first author of the topic (e.g., 80% and/or 0.80) and the weight of the topic (e.g., 0.70) in the document. The product may be equal to, for example, 0.56 (e.g., 0.56=(0.80*0.70)). Similarly, an authority signature value for a second author of the first topic may be updated by adding a product of the authorship percentage for the second author of the topic (e.g., 20% and/or 0.20) and the weight of the topic (e.g., 0.70) in the document, which may be equal to 0.14 (e.g., 0.14=(0.20*0.70)).

In some aspects, an update to an authority signature value for the first author of a second topic may be generated based on the product of an authorship percentage for the first author of the second topic and the weight of the second topic in the document. Similarly, updates to authority signatures for each author (e.g., among one or more authors) of a topic may be generated for each topic in a document. Each authority signature for an author of a topic may be updated based on a product of an authorship percentage for that author of that topic and a weight of that topic in the document. A first topic in a document may, for example, be authored by multiple authors (e.g., any number of authors and/or N authors), and an update to authority signature value(s) for a plurality of authors of that topic may be generated.

In some aspects, if an authority signature value for an author (e.g., a first author) of a topic (e.g., a first topic) does not exist and/or is not included in, for example, system 500, an authority signature for that author of that topic may be generated. An authority signature for that author of that topic may be generated based on a product of an authorship percentage for that author of that topic and the weight of that topic in a document. An authority signature value for an author of a topic may not exist if, for example, the author has not previously authored a document (e.g., stored in system 500), the author has not previously authored document content related to the topic, the topic is a new topic, and/or for any other reason.

In some aspects, topic information and authorship information may be received for a second document (e.g., a second document among multiple documents), and may be used to generate an update to an authority signature value for a first author of a first topic. An update to an authority signature value for a first author of a first topic may be generated based on a product of a second document first topic authorship percentage for the first author and a weight of the first topic in the second document.

By way of example, the following table may show topic weights for first, second and third topics in a second document, authorship percentages for a first author of each topic; authorship percentages for a second author of each topic; and possibly other information.

| Topic | Weight | 1$^{st}$ Author | 2$^{nd}$ Author |
| --- | --- | --- | --- |
| 1$^{st}$ Topic | 0.05 | 1.0 | 0.0 |
| 2$^{nd}$ Topic | 0.0 | 0.0 | 0.0 |
| 3$^{rd}$ Topic | 0.95 | 0.0 | 1.0 |

A second document may include two or any number of topics (e.g., a first topic and a third topic). For example, 5% of the content and/or text in the second document may be about, pertain to, and/or related to a first topic, and 95% of the content and/or text in the second document may be about a third topic. A second document may, for example, not include any document content related to the second topic in the first document discussed above. The first topic in the second document may be authored by, for example, one author (e.g., the first author). Thus, the second author may have authored 0% of second document content related to the first topic (e.g., none of the content), and the first author may have authored 100% of second document content related to the first topic (e.g., all of the content). An update to an authority signature value for the first author of the first topic may be generated based on a product of the second document topic authorship percentage for the first author of the first topic in the second document (e.g., 100%) and a weight of the first topic in the second document (e.g., 0.05 and/or 5%). The following table may show an update to an authority signature value for a first author of a second topic. The update to the authority signature value for the first author of the first topic (e.g., 0.05) may be added to the authority signature value for the first author the first topic (e.g., 0.56) to generate an updated authority signature value for the first author of the first topic (e.g., 0.61). An update to an authority signature value for a second author and/or possibly other authors of the third topic and/or other topics may similarly be generated.

| Topic | Authority Signature Update Doc. 1 | Authority Signature Update Doc. 2 | Authority Signature Value |
|---|---|---|---|
| 1st Topic | 0.56 | 0.05 | 0.61 |

In some aspects, topic information and authorship information may be received for one or more documents in set of documents (e.g., all documents in a set of documents and/or document set), and an update to authority signature value(s) for one or more authors of one or more topics may be generated. An update to authority signature(s) for one or more authors of one or more topics may be generated based on a product of an authorship percentage for that author of a topic and a weight of that topic in a document. An update to authority signature(s) for the one or more authors may be generated for one or more topics (e.g., each topic) in the one or more documents in the document set (e.g., each document in the document set). An authority signature for an author of a topic may, in some aspects, be a sum of products of each authorship percentage for that author of that topic in a document and a weight of that topic in that document for each of one or more documents. An authority signature for an author of a topic may be, for example, a sum of product terms, where one factor in each product term is an authorship percentage for an author, and the second factor in each term is a weight of the topic in that document, for each of one or more documents.

In some aspects, one or more authority signature values may be stored in a database. For example, a plurality of authority signature values including authority signature values for a query topic may be stored in a database (e.g., database, memory, or storage in system 500). In response to a request regarding a query topic, one or more authors (e.g., users) having a predetermined rank or authority signature value for the query topic may be retrieved and displayed. One or more authors may, for example, be ranked, grouped, and/or categorized based on authority signature values for the query topic, and one or more authors may retrieved and displayed based on the ranking, grouping and/or categorization.

In some aspects, one or more users (e.g., authors) with highest ranked authority signature values for the query topic may be output (e.g., to a user, to a component within system 500, or to another device or system). For example, an author (e.g., an identity of an author) associated with a highest ranked authority signature value for a query topic may be retrieved and output (e.g., displayed to a user). In some aspects, any number of highest ranked authors (e.g., a top N authors) may be retrieved and output (e.g., displayed to user).

According to some aspects, all users (e.g., identities of all users) with an authority signature value for the query topic above a threshold value may be output (e.g. to a user, a component or system 500, or any other system or device). Authority signature values for one or more authors of a query topic may be, for example, compared to a threshold authority signature value, and one or more authors associated with authority signature values above the threshold authority signature value may be output. A threshold authority signature value may be, for example, a fixed threshold authority signature value (e.g., a predetermined threshold authority signature, a static threshold authority signature), a varying threshold authority signature value, or any other type of threshold authority signature value. A static threshold authority signature value may be any authority signature value generated by, for example, a user, system 500, or any other system or process.

In some aspects, an identity of a group of authors associated with a group of authority signature values may be output. Authority signature values (e.g., associated with author(s)) may be, for example, categorized into classes or groups using an automatic grouping, clustering, or other approach. An automatic grouping, clustering, or other similar approach may be, for example, a K-means, difference in means, agglomerative hierarchical clustering (e.g., a bottom up clustering approach), or other method(s). In an automatic grouping approach, a varying threshold authority signature may be generated, for example, using an automatic threshold detection or other approaches. A varying authority signature value threshold for a topic may, for example, be calculated based on one or more authority signature values for that topic. A varying threshold authority signature may, therefore, be related to authority signature value distribution and may vary as authority signature value data is added, removed, and/or altered. Authority signature values and associated authors may be automatically grouped based on a varying threshold authority signature value, and one or more groups of authors may be output (e.g., to a user, system 500, or another system or device).

Figure 2:
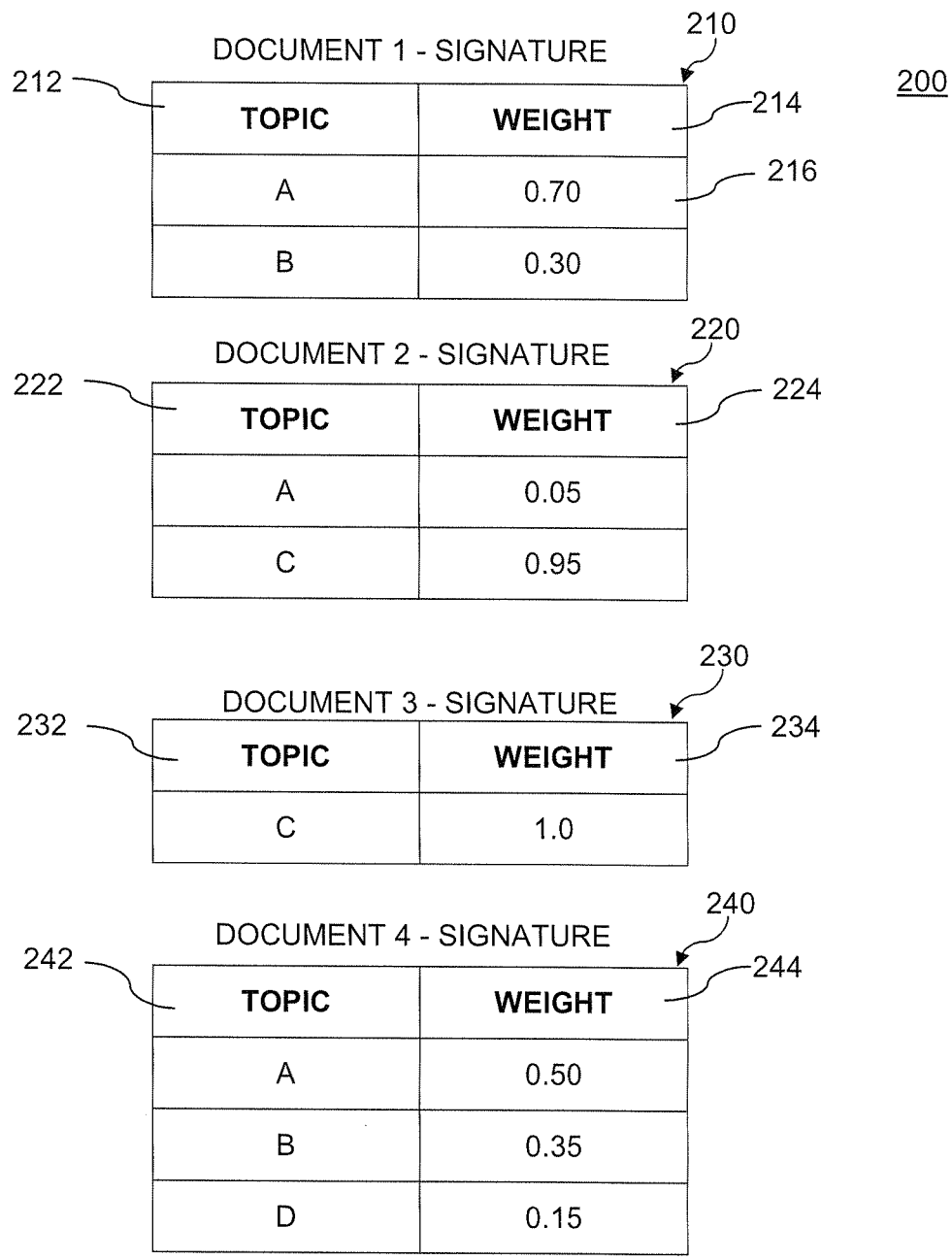
FIG. 2 is a diagram of document signatures according to aspects of the present disclosure.

FIG. 2 shows a diagram 200 depicting topics, weights, and a topic index associated with one or more documents according to aspects of the present disclosure. Topic information (e.g., a document signature) for a first document 210 (e.g., Document 1) may include one or more topics 212 (e.g., two topics) and a weight 214 for each topic. Topics 212 relating to a source document may include, for example, topic A and topic B. Topic A and topic B may be any two topics (e.g., restaurants, legal document types, medical topics, or any other topics). Each topic may be associated with a weight (e.g., topic A weight or topic B weight). Document 1 topic weights 214 may represent or quantify how strongly a topic is associated with source document text. A topic A weight 216 may indicate, for example, that 0.70 or 70 percent (%) of Document 1 is about or related to topic A. Similarly, a topic B weight may indicate that 0.30 or 30% of Document 1 is about or related to topic B. Topic weights (e.g., topic A weight and topic B weight) associated with each topic in a document text may, for example, sum to 1.0, 100%, or any other value.

Information for a second document 220 (e.g., Document 2) may include one or more topics 222 (e.g., two topics) and a weight 224 for each topic. Topics 222 relating to Document 2 may include, for example, a topic A and topic C, and each topic may be associated with a weight 224 (e.g., topic A weight and topic C weight). Topic A weight may indicate, for example, that 0.05 or 5% of a second document text is about topic A, and topic C weight may indicate that 0.95 or 95% of the second document text is about topic C. Topic weights (e.g., topic A weight and topic C weight) may, for example, sum to 1.0, 100%, or another value.

Information for a third document 230 (e.g., Document 3) may include one topic 232 (e.g., one topic) and a corresponding weight 234 (e.g., topic C weight). Topic C weight may indicate that 1.0 or 100% of Document 3 is about topic C or that Document 3 is only about topic C.

Information for a fourth document 240 (e.g., Document 4) may include one or more topics 242 and weights 244 for each topic. Topics 242 relating to a fourth document 240 may include, for example, topic A, topic B, and topic D. Each topic may be associated with a weight, for example, topic A weight, topic B weight, and topic D weight.

FIG. 3 shows a diagram of document authorship information for one or more documents according to aspects of the present disclosure. Authorship information (e.g., Document 1 authorship information 302, Document 2 authorship information 304, Document 3 authorship information 306, Document 4 authorship information 308) for one or more documents may be received by, for example, system 500. Authorship information for a document may include for each topic (e.g., Document 1 topics 310, Document 2 topics 330, Document 3 topics 350, Document 4 topics 370) in a document at least one author and a topic authorship percentage for each author.

Authorship information 302 for a first document (e.g., Document 1 authorship information 320) may be received by, for example, system 500. Document 1 authorship information 302 may include, for each topic 310 in Document 1, at least one author and corresponding topic authorship information 320. As discussed above in connection with FIG. 2, Document 1 may, for example, include two topics (e.g., topic A and topic B). FIG. 3 shows that topic A may, for example, be associated with two authors: user X and user Y. User X may have contributed, added, generated, and/or authored 80% (e.g., 0.80) of Document 1 content related to topic A, and user Y may have contributed, added, generated, and/or authored 20% (e.g., 0.20) of Document 1 content related to topic A. Therefore, user X authorship percentage for topic A 322 (e.g., a user X topic A authorship percentage) may be 80% (e.g., 0.80) and user Y authorship percentage for topic A 324 may be 20% (e.g., 0.20). Topic B as discussed in Document 1 may be associated with one author: user Z. User Z topic authorship percentage for topic B (e.g., user Z topic B authorship percentage) may be 100% (e.g., 1.0) indicating that user Z is a sole author of topic B and/or that user Z authored all information relating to topic B in Document 1.

Authorship information 304 for a second document (e.g., Document 2 authorship information) may be received by, for example, system 500. Document 2 authorship information 304 may include, at least one author and topic authorship information 340 for each topic 330 in Document 2. Document 2 may, for example, include two topics (e.g., topic A and topic C). Topic A in Document 2 may be associated with one author: user X. User X may have contributed, added, generated, and/or authored 100% (e.g., 1.0) of document text and/or content related to topic A in Document 2. User X authorship percentage for topic A may be 100% (e.g., 1.0) indicating that user X is a sole author of topic A and/or that user X authored all of the information relating to topic A in Document 2. Topic C may be associated with one author: user Y. User Y authorship percentage for topic C may be 100% (e.g., 1.0) indicating that user Y is a sole and/or only author of topic C and/or that user Y authored all of the information relating to topic C in Document 2.

Authorship information 306 for a third document (e.g., Document 3 authorship information) may be received by, for example, system 500. Document 3 authorship information 306 may include, at least one author and topic authorship information 360 for each topic 350 in Document 3. Document 3 may include, for example, one topic (e.g., topic C). Topic C in Document 3 may be associated with two authors: user Y and user Z. User Y may have contributed 60% (e.g., 0.60) of Document 3 content related to topic C, and user Z may have contributed 40% (e.g., 0.40) of Document 3 content related to topic C. User Y authorship percentage for topic C in Document 3 may be 60% (e.g., 0.60), and user Z authorship percentage for topic C may be 40% (e.g., 0.40).

Authorship information 308 for a fourth document (e.g., Document 4 authorship information) may be received by, for example, system 500. Document 4 authorship information 308 may include, at least one author and topic authorship information 380 for each topic 370 in Document 4. Document 4 may include three topics (e.g., topic A, topic B, and topic D). Topic A in Document 4 may be associated with one author: user X. User X authorship percentage may be, for example, 100% (e.g., 1.0) indicating, for example, that user X is the sole author of topic A in Document 4. Topic B in Document 4 may be associated with two authors: user X and user Y. User X authorship percentage for topic B in Document 4 may be 30% (e.g., 0.30), and user Z authorship percentage for topic B may be 70% (e.g., 0.70). Topic D in Document 4 may be associated with two authors: user X and user Z. User X authorship percentage for topic D in Document 4 may be 50% (e.g., 0.50), and a user Z authorship percentage for topic D may be 50% (e.g., 0.50). User X authorship percentage (e.g., 50%) and user Z authorship percentage (e.g., 50%) may indicate that user X and user Z equally contributed (e.g., each contributed half) to generation, creation, editing, composing, rendering, initiating, outputting, and/or drafting of topic D in Document 4.

FIG. 4 shows a diagram 400 depicting authority signatures for document users according to aspects of the present disclosure. An update to an authority signature value for an author (e.g., a first author) of a topic (e.g., a first topic) may be generated based on a product of an authorship percentage for the author of the topic and the weight of the topic in a document.

In some aspects, an authority signature value for an author of a topic may, for example, include one or more authority signature entries. An authority signature entry for an author of a topic may, for example, be generated based on a product of an authorship percentage for the author of that topic in a document (e.g., Document 1 410) and a weight of that topic in the document. An authority signature value for an author of a topic may be, for example, a sum of one or more authority signature entries for that topic (e.g., based on an authorship percentage and topic weights associated with document content in one or more documents). For example, an authority signature entry for a first author (e.g., user X) of a first topic (e.g., topic A) may be generated based on an authorship percentage for the first author of the first topic in a document (e.g., Document 1 410). The authority signature entry for the first author of the first topic may, for example, be added to the authority signature value (e.g., authority signature 460) for the first author of the first topic.

In some aspects, an update to an authority signature value for a second author (e.g., user Y) of a first topic (e.g., topic A) may be generated based on a product of an authorship percentage for the second author (e.g., user Y) of the first topic (e.g., topic A) and the weight of the first topic in the document (e.g., Document 1 410).

In some aspects, topic information and authorship information may be received for a second document (e.g., Document 2 420). An update to an authority signature value for a first author of a first topic in the second document (e.g., Document 2 420) may be generated. An update to an authority signature value for the first author of the first topic may be generated based on a product of a second document first topic authorship percentage for the first author and a weight of the first topic in the second document.

In some aspects, topic information and authorship information may be received for one or more documents in a set of documents (e.g., Document 1 410, Document 2 420, Document 3 430, Document 4 440), and an update to authority signature(s) for one or more authors of one or more topics may be generated.

In some aspects, authority signatures may be updated according to the following steps, process and/or order of operations. For a first document, an update to an authority signature value for each author of a first topic may be generated. An update to an authority signature value for each author of a second topic may then be generated. For each topic in the first document, an update to an authority signature value for each author of that topic may be generated. The process, steps, and/or operations may be repeated for a second document, third document and/or any number of documents (e.g., in a document set). Other processes and/or operations of generating authority signatures may of course be used.

In this example, authority signature(s) (e.g., user X authority signature(s) 402, user Y authority signature(s) 404, user Z authority signature(s) 406) may include multiple authority signature values for multiple topics for each author. Authority signatures (e.g., user X authority signature 402, user Y authority signature 404, user Z authority signature 406) may be updated for each author of each topic (e.g., topic A and topic B) in Document 1 410. An authority signature value for user X of topic A 460 (e.g., authority signature for author X of topic A) may be updated to include an authority signature entry for user X of topic A in Document 1. An authority signature entry for user X of topic A in Document 1 (e.g., 0.56 as shown in column 2, row 2 of User X-Authority Signature in FIG. 4) may be equal to a product of an authorship percentage for user X of topic A in Document 1 322 (e.g., 0.80 and/or 80%) and a weight of topic A in Document 1 216 (e.g., 0.70).

Similarly, an authority signature value for user Y of topic A 462 (e.g., authority signature for author Y of topic A) may be updated to include an authority signature entry for user Y of topic A in Document 1. An authority signature entry for user Y of topic A in Document 1 (e.g., 0.14 as shown in column 2, row 2 of User Y-Authority Signature in FIG. 4) may be equal to a product of an authorship percentage for user Y of topic A in Document 1 324 (e.g., 0.20 and/or 20%) and a weight of topic A in Document 1 216 (e.g., 0.70).

An authority signature for user Z of topic B 464 (e.g., authority signature for author Z of topic B) may be updated to include an authority signature entry for user Z of topic B in Document 1. An authority signature entry for user Z of topic B in Document 1 (e.g., 0.30=(1.0*0.30)) may be equal to an authorship percentage for user Z of topic B in Document 1 (e.g., 1.0 and/or 100%) and a weight of topic B in Document 1 (e.g., 0.30).

In this example, authority signatures (e.g., user X authority signature 402, user Y authority signature 404) may be updated based on topic information for a second document 420 (e.g., Document 2). Authority signatures (e.g., user X authority signature 402, user Y authority signature 404) may be updated for each author of each topic (e.g., topic A and topic C) in Document 2 420. A user Z authority signature 406 may not be updated because user Z is not an author of any content in Document 2 420. An authority signature for user X of topic A 460 may be updated to include an authority signature entry (e.g., 0.05=(1.0*0.05)) for user X of topic A in Document 2. A user X authority signature entry for topic A in Document 2 may be equal to an authorship percentage for user X of topic A in Document 2 (e.g., 1.0 and/or 100%) and a weight of topic A in Document 2 (e.g., 0.05). Using a similar approach, an authority signature for user Y of topic C 466 may be updated to include an authority signature entry (e.g., 0.95=(1.0*0.95)) for user Y of topic C in Document 2. User X authority signature 402 and user Y authority signature 404 may be updated accordingly to include these values.

In this example, authority signatures (e.g., user Y authority signature 404, user Z authority signature 406) may be updated based on topic information for a third document 430 (e.g., Document 3). Authority signatures (e.g., user Y authority signature 404, user Z authority signature 406) may be updated for each author of each topic (e.g., topic B and topic C) in Document 3 430. User X authority signature 402 may not be updated because user X is not an author of any content in Document 3 430. An authority signature for user Y of topic C 466 may be updated to include an authority signature entry (e.g., 0.60=(0.6*1.0)) for user Y of topic C in Document 3. A user Y authority signature entry may be equal to an authorship percentage for user Y of topic C in Document 3 (e.g., 0.6 and/or 60%) and a weight of topic C in Document 3 (e.g., 1.0). Using a similar approach, an authority signature for user Z of topic C 468 may be updated to include an authority signature entry for user Z of topic C in Document 3 (e.g., 0.4=(0.4*1.0)). User Y authority signature 404 and user Z authority signature 406 may be updated accordingly to include these values.

In this example, authority signatures (e.g., user X authority signature 402, user Z authority signature 406) may be updated based on topic information for a fourth document 440 (e.g., Document 4). Authority signatures (e.g., user X authority signature 402, user Z authority signature 406) may be updated for each author of each topic (e.g., topic A, topic B and topic D) in Document 4 440. A user Y authority signature 404 may not be updated because user Y is not an author of any content in Document 4 440. An authority signature for user X of topic A 460 may be updated to include an authority signature entry for user X of topic A in Document 4 (e.g., 0.50=(1.0*0.50)). An authority signature for user X of topic B 470 may be updated to include an authority signature entry for user X of topic B in Document 4 (e.g., 0.11=(0.30*0.35)). An authority signature for user Z of topic B 464 may be updated to include an authority signature entry for user Z of topic B in Document 4 (e.g., 0.25=(0.70*0.35)). An authority signature for user X of topic D 472 may be updated to include an authority signature entry for user X of topic D in Document 4 (e.g., 0.08=(0.50*0.15)). An authority signature for user Z of topic D 474 may be updated to include an authority signature entry for user Z of topic D in Document 4 (e.g., 0.08=(0.50*0.15)).

Authority signatures for an author of a topic may be, for example, a sum of one or more authority signature entries for that author of that topic in one or more documents. In some aspects, authority signatures for an author of a topic may be updated by adding one or more authority signature entries for that author of that topic in one more documents. For example, an authority signature 460 for user X of topic A may be a sum of, for example, an authority signature entry for user X of topic A in Document 1 (e.g., 0.56=(0.80*0.70)), an authority signature entry for user X of topic A in Document 2 (e.g., 0.05=(1.0*0.05)) and an authority signature entry for user X of topic A in Document 4 (e.g., 0.50=(1.0*0.50)). Similarly, each authority signature value for an author of a topic (e.g., authority signature values 460, 462, 464, 466, 468, 470, 472, 474) may be a sum of authority signature entries for that author of that topic in one or more documents.

FIG. 5 shows an illustrative computer system 500 suitable for implementing methods and systems according to an aspect of the present disclosure. The computer system may comprise, for example, a computer running any of a number of operating systems. The above-described methods of the present disclosure may be implemented on the computer system 500 as stored program control instructions.

Computer system 500 includes processor 510, memory 520, storage device 530, and input/output structure 540. One or more input/output devices may include a display 545. One or more busses 550 typically interconnect the components, 510, 520, 530, and 540. Processor 510 may be a single or multi core.

Processor 510 executes instructions in which aspects of the present disclosure may comprise steps described in one or more of the Figures. Such instructions may be stored in memory 520 or storage device 530. Data and/or information may be received and output using one or more input/output devices.

Memory 520 may store data and may be a computer-readable medium, such as volatile or non-volatile memory, or any transitory or non-transitory storage medium. Storage device 530 may provide storage for system 500 including for example, the previously described methods. In various aspects, storage device 530 may be a flash memory device, a disk drive, an optical disk device, or a tape device employing magnetic, optical, or other recording technologies.

Input/output structures 540 may provide input/output operations for system 500. Input/output devices utilizing these structures may include, for example, keyboards, displays 545, pointing devices, and microphones—among others. As shown and may be readily appreciated by those skilled in the art, computer system 500 for use with the present disclosure may be implemented in a desktop computer package 560, a laptop computer 570, a hand-held computer, for example a tablet computer, personal digital assistant, mobile device, or smartphone 580, or one or more server computers that may advantageously comprise a "cloud" computer 590.

The systems and methods discussed herein and implemented using, for example, system 500, may be used to compute information and data related to billions of individual documents associated with millions of individual users in real-time. Individual users, for example, may each store, edit, modify, and otherwise manipulate thousands of documents. In some aspects of the present disclosure, generation, calculation, computation, determination and other methods and system operations discussed herein may be completed in parallel, simultaneously or in real-time for millions of individual users worldwide and/or globally.

At this point, while we have discussed and described the disclosure using some specific examples, those skilled in the art will recognize that our teachings are not so limited. Accordingly, the disclosure should be only limited by the scope of the claims attached hereto.

The invention claimed is:

1. A computer-implemented method for determining topical authority, comprising:
   receiving, at a computer system, topic information for a document, the information including at least one topic and a weight for each topic, where the topic relates to content of the document, and the weight represents how strongly the topic is associated with the document;
   receiving authorship information for the document, the information including, for each topic in the document, at least one author and an authorship percentage for each author;
   generating a first update to an authority signature value for a first author of a first topic based on a product of the authorship percentage for the first author of the first topic and the weight of the first topic in the document, where the first topic is included in the received topic information;
   receiving topic information for a second document, the information including at least one topic and a weight for each topic;
   receiving authorship information for the second document, the information including, for each topic in the second document, at least one author and an authorship percentage for each author; and
   generating a second update to the authority signature value for the first author of the first topic based on a product of the second document first topic authorship percentage for the first author and the weight of the first topic in the second document.

2. The method of claim 1, wherein the generating the first update step comprises:
   generating, if an authority signature value for the first author of the first topic does not exist, an authority signature value for the first author of the first topic based on the product of the authorship percentage for the first author of the first topic and the weight of the first topic in the document.

3. The method of claim 1, further comprising:
   generating an update to an authority signature value for a second author of the first topic based on the product of the authorship percentage for the second author of the first topic and the weight of the first topic in the document.

4. The method of claim 1, further comprising:
   generating an update to an authority signature value for the first author of a second topic based on the product of the authorship percentage for the first author of the second topic and the weight of the second topic in the document.

5. The method of claim 1, further comprising:
   storing a plurality of authority signature values in a database; and
   retrieving and displaying information regarding one or more authors from the database having a predetermined rank or authority signature value for a query topic in response to a request regarding the query topic.

6. The method of claim 5, wherein the retrieving and displaying step comprises:
   outputting information regarding one or more users with highest ranked authority signature values for the query topic.

7. The method of claim 5, wherein the retrieving and displaying step comprises:
   outputting information regarding all users with authority signature values for the query topic above a threshold value.

8. A computer-implemented system for determining topical authority comprising:
   a non-transitory memory; and
   said system configured to:
   receive topic information for a document, the information including at least one topic and a weight for each topic, where the topic relates to content of the document, and the weight represents how strongly the topic is associated with the document;
   receive authorship information for the document, the information including, for each topic in the document, at least one author and an authorship percentage for each author;

generate a first update to an authority signature value for a first author of a first topic based on a product of the authorship percentage for the first author of the first topic and the weight of the first topic in the document, where the first topic is included in the received topic information;

receive topic information for a second document, the information including at least one topic and a weight for each topic;

receive authorship information for the second document, the information including, for each topic in the second document, at least one author and an authorship percentage for each author; and generate a second update to the authority signature value for the first author of the first topic based on a product of the second document first topic authorship percentage for the first author and the weight of the first topic in the second document.

9. The system of claim 8, wherein to generate the first update, the system is configured to:

generate, if an authority signature value for the first author of the first topic does not exist, an authority signature value for the first author of the first topic based on the product of the authorship percentage for the first author of the first topic and the weight of the first topic in the document.

10. The system of claim 8, further configured to:

generate an update to an authority signature value for a second author of the first topic based on the product of the authorship percentage for the second author of the first topic and the weight of the first topic in the document.

11. The system of claim 8, further configured to:

store a plurality of authority signature values in a database; and retrieve and display information regarding one or more authors from the database having a predetermined rank or authority signature value for a query topic in response to a request regarding the query topic.

12. The system of claim 11, wherein to retrieve and display information the system is to:

output information regarding one or more users with highest ranked authority signature values for the query topic.

13. The system of claim 11, wherein to retrieve and display information the system is to:

output information regarding all users with authority signature values for the query topic above a threshold value.

14. A non-transitory computer storage medium having computer executable instructions which when executed by a computer cause the computer to perform operations comprising:

receiving topic information for a document, the information including at least one topic and a weight for each topic, where the topic relates to content of the document, and the weight represents how strongly the topic is associated with the document;

receiving authorship information for the document, the information including, for each topic in the document, at least one author and an authorship percentage for each author;

updating an authority signature value for a first author of a first topic based on a product of the authorship percentage for the first author of the first topic and the weight of the first topic in the document, where the first topic is included in the received topic information;

receiving topic information for a second document, the information including at least one topic and a weight for each topic;

receiving authorship information for the second document, the information including, for each topic in the second document, at least one author and an authorship percentage for each author; and updating the authority signature value for the first author of the first topic based on a product of the second document first topic authorship percentage for the first author and the weight of the first topic in the second document.

15. The non-transitory computer storage medium of claim 14, which further causes the computer to perform a further operation comprising:

updating an authority signature value for a second author of the first topic based on the product of the authorship percentage for the second author of the first topic and the weight of the first topic in the document.

16. The non-transitory computer storage medium of claim 14, which further causes the computer to perform further operations comprising:

storing a plurality of authority signature values in a database; and retrieving and displaying information regarding one or more authors from the database having a predetermined rank or authority signature value for a query topic in response to a request regarding the query topic.

17. The non-transitory computer storage medium of claim 16, which further causes the computer to perform a further operation comprising:

outputting information regarding one or more users with highest ranked authority signature values for the query topic.

* * * * *